June 28, 1966 M. J. FLEMING, JR 3,258,662

SEMICONDUCTOR HOUSING

Filed May 10, 1963

*INVENTOR.*
MATTHEW J. FLEMING, JR.
BY
*Kenway, Jenney & Hildreth*
ATTORNEYS

United States Patent Office 3,258,662
Patented June 28, 1966

3,258,662

SEMICONDUCTOR HOUSING

Matthew J. Fleming, Jr., Bay Village, Ohio, assignor, by mesne assignments, to International Telephone and Telegraph Corporation, New York, N.Y., a corporation of Maryland Filed May 10, 1963, Ser. No. 279,434
5 Claims. (Cl. 317—234)

Figure 1:
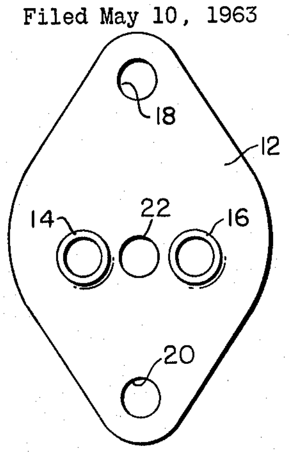

This invention relates in general to semiconductor devices and in particular to a heat-dissipating housing for such devices.

Many semiconductor devices are specifically designed for power applications where considerable heat is generated in the device. In the case of diodes used for rectifying heavy currents and in power transistors which are used for controlling or amplifying power, proper operation, achievement of rated performance and long useful life are dependent upon the ability of the devices to dissipate heat which is generated internally.

As a result of the limitations imposed by heat generated in the device, much effort has been expended to develop structures which remove excess heat from the device. In the case of diodes, it is common to mount the device upon a heavy base which includes a brass or copper bolt extending from the base to be secured to a metallic surface on which the device is mounted. The most common expedient used for power transistors is somewhat similar in concept. Usually, a heavy copper base is provided, and it includes a protrusion which is coined or drawn in the base. This protrusion is on the interior surface of the base, and it is the custom to locate the transistor in such a fashion that the collector is is disposed upon the protrusion because most of the heat is generated at the collector junction. Frequently, the collector is literally soldered to the protrusion to provide not only high heat conductivity, but electrical connection as well. In addition to the heavy copper base member, a cover made of the same material is customarily used. After the device is assembled upon the base and suitable connections are made, the cover is sealed in place upon the base.

The present invention is concerned principally with the improvement of housings for power transistors, but its teaching may equally well be applied to other semiconductor devices such as diode rectifiers where heat is a problem, and its primary object is the improvement of semiconductor device housings.

Another object of the present invention is the reduction of cost of materials for semiconductor housings.

Still another object is the simplification of the fabrication of parts for semiconductor housings.

A further object of the present invention is the improvement of operating characteristics of semiconductor devices.

In general, the present invention is organized about a two-part housing, consisting of a base member and a cover member, the former being especially designed for receiving a pedestal of high thermal conductivity. Both the base and cover members are made of relatively inexpensive material which may be molded, formed, spun-cast, stamped or otherwise fabricated in the desired configurations. The pedestal and the semiconductor device within the housing are held in intimate contact, the pedestal being suitably formed at its upper end to provide an area of convenient size to accommodate the heat-generating element of the device. Moreover, the lower end of the pedestal is designed to extend beyond the actual surface of the base to insure good contact with the surface on which the base is mounted.

Figure 2:
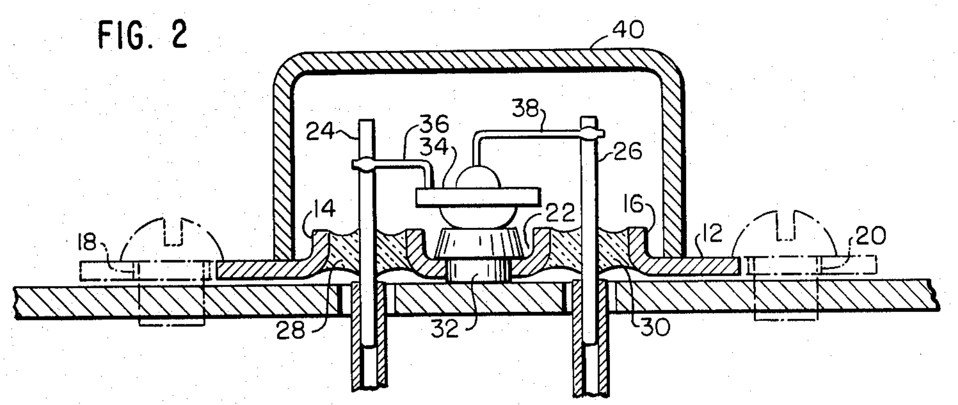

For a better understanding of the present invention, together with other and further objects, advantages and features, reference should be made to the following description of a preferred embodiment, which should be read in conjunction with the appended drawing in which:

FIG. 1 is a top view of the base portion of a housing built in accordance with the present invention; and FIG. 2 is a view in cross-section of a power transistor built in accordance with the principles of the present invention.

In FIG. 1 of the drawing, there may be seen a base 12 which as noted above may be fabricated of any suitable inexpensive material such as glass, plastic or metal by any well known process. However, presently it is preferred to stamp the base from cold rolled steel of drawing quality. Although it is not a critical limitation, 20-gauge steel has been found to be quite satisfactory for this purpose. When the base member 12 is stamped, five openings are also punched in the member. Two of these openings, 14 and 16, are formed in alignment and slightly off-center to facilitate subsequent device mounting. These openings are utilized for the introduction of conductors to the device. Two other similar openings, 18 and 20, adjacent the ends of the base are provided for the reception of mounting screws. Still another central opening 22 is provided for purposes which are explained in greater detail below.

After the base member is stamped and punched, as may be seen in FIG. 2, conductors in the form of beaded leads 24 and 26 are hermetically sealed in the openings 14 and 16. The glass beads 28 and 30 which surround the leads 24 and 26 insulate those leads from the base member 12 and provide physical support to those leads as well. In some instances, the beaded leads are sealed in eyelets which, in turn, may be sealed in the openings in the base.

In the central opening 22 a post or pedestal 32 is sealed by brazing or other suitable technique. The pedestal 32 is preferably made of a material of high thermal conductivity such as copper. It is formed with a frusto-conical top portion having a flat upper surface and a flat step which is of greater diameter than that of the aperture 22. The lower portion of the pedestal 32 is of a diameter sufficient to provide a close fit in the aperture 22. Also, the length of the lower portion of the pedestal is somewhat greater than the thickness of the base member 12 with the result that it extends for some slight distance below that surface. In a preferred embodiment of the device, the pedestal extends .008" to .010" beneath the base.

Mounted upon the top flat surface of the pedestal 32 is a three-element semiconductor device 34, such as might be used in a power transistor. The collector of the semiconductor device 34 rests upon the pedestal and is preferably soldered in place. A connection is made from the lead 24 to the central element of the device, in this case the base, by means of a connector 36 which may be welded at one end to the lead 24 and compression-bonded to the base. Similarly, a connector 38 is compression-bonded to the emitter of the device and welded at its other end to the lead 26. When the assembly of the device is completed, a cover 40 is attached to the base. Parenthetically, it shoald be noted that the cover 40, like the base 12, may be made in any one of a variety of ways from one of a number of suitable materials.

Any one of several processes may be used to seal the cover 40 to the base 12, depending upon the materials involved. It may be heliarc welded, brazed, or even swaged to form a suitable seal where, as in the preferred embodiment, stamped steel is used. The cover in such case may be the same 20-gauge steel which is preferred for the base 12.

In putting the device into use, the same technique that is followed in operating similar prior art devices may be practiced. The base is brought into close physical contact with a metallic mounting surface by means of screws or bolts passing through the openings 18 and 20. When the base is pulled down as tightly as possible by means of the mounting screws, a bottom surface of the post or pedestal 32 meets the mounting surface first. Obviously, openings must be provided in the mounting surface not only for the mounting screws, but also to provide clearance for the leads 24 and 26, to which connections may be made by means of contacts disposed at or beneath the mounting surface. With minor modifications, the structure described above may be easily and simply adapted to serve as a housing for diodes or other devices in which the transfer or removal of heat from the semiconductor device is desirable. Not only the cold rolled steel mentioned above, but other relatively inexpensive metals may be used in both the base and cover members, the only requirement being that the material be capable of being drawn and perforated. Similarly, the pedestal 32 need not be made of copper, but may be made of any material having high thermal conductivity. In other words, numerous combinations of materials are practical. The criteria for the base and cover are low cost and ease of fabrication; while the criterion for the pedestal is high thermal conductivity. The method of connection of the various elements or the configuration of the parts may be varied at will without departing from the scope of the invention, subject only to the requirement that the source of internal heat be in close contact with the element of high thermal conductivity.

Although what has been shown and described constitutes a preferred embodiment of the invention, alternatives other than those indicated above will suggest themselves to those skilled in the art upon a reading of the foregoing specification. However, all such alternatives are believed to be within the purview of the present invention which should be limited only by the spirit and scope of the appended claims.

What is claimed is:

1. In a housing for a semiconductor device, a base member of relatively low thermal conductivity forming a part of said housing and for mounting said housing, said base member having at least an aperture formed therethrough, and a pedestal formed of material of relatively high thermal conductivity for supporting said semiconductor device, said pedestal having an integral extension sealed in said aperture and extending a slight distance beyond the other surface of said base member whereby when said housing is mounted said base member is offset from the surface on which it is mounted by said slight distance, said base member having apertures for leads extending from said semiconductor device to the outside.

2. A housing for a semiconductor device comprising a base member for mounting said housing stamped from relatively thin steel and having at least an aperture formed therethrough, and a pedestal formed of relatively thick copper sealed in said aperture, the inner end of said pedestal supporting and being in heat-conducting relationship to said device and the outer end said pedestal extending a slight distance beyond the outer surface of said base member whereby when said housing is mounted said base member is offset from the surface on which it is mounted by said slight distance, said base member having apertures for leads extending from said semiconductor device to the outside.

3. A housing as defined in claim 2 including a cover member also stamped from relatively thin steel joined to said base member to complete the enclosure of said device.

4. A housing for a power transistor comprising base and cover members formed of relatively thin steel, said base member for mounting said housing having an aperture formed therethrough and a copper pedestal sealed in said aperture, the inner end of said pedestal being in contact with the collector of said transistor and the outer end of said pedestal extending a slight distance beyond the outer surface of said base member whereby when said housing is mounted said base member is offset from the surface on which it is mounted by said slight distance, said base member having apertures for leads extending from said semiconductor device to the outside.

5. A heat sink for a power transistor comprising a mounting surface for said transistor, a housing for said transistor made of material of relatively low thermal conductivity and having an aperture formed therethrough, the bottom element of said housing being used for mounting said housing, a post made of material of relatively high thermal conductivity sealed in said aperture, the upper end of said post being of greater diameter than said aperture and forming a pedestal for supporting the collector of said transistor, the lower end of said post extending a slight distance beyond the bottom element of said housing and contacting said mounting surface forming a heat-conducting path from said collector to said mounting surface and said bottom element is offset from said mounting surface by said slight distance, said bottom element of said housing having apertures for leads extending from said semiconductor device to the outside.

References Cited by the Examiner

UNITED STATES PATENTS

| | | | |
|---|---|---|---|
| 2,838,722 | 6/1958 | Watson | 317—235 |
| 2,984,774 | 5/1961 | Race | 317—234 |

FOREIGN PATENTS

| | | |
|---|---|---|
| 661,703 | 4/1963 | Canada. |

JOHN W. HUCKERT, *Primary Examiner.*

M. EDLOW, *Assistant Examiner.*